(12) United States Patent
Sano

(10) Patent No.: US 7,868,611 B2
(45) Date of Patent: Jan. 11, 2011

(54) ROTARY ANGLE DETECTING DEVICE

(75) Inventor: Tadashi Sano, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 64 days.

(21) Appl. No.: 12/436,346

(22) Filed: May 6, 2009

(65) Prior Publication Data

US 2009/0289623 A1 Nov. 26, 2009

(30) Foreign Application Priority Data

May 20, 2008 (JP) .............................. 2008-132395

(51) Int. Cl.
*G01B 7/30* (2006.01)

(52) U.S. Cl. ................................. 324/207.25

(58) Field of Classification Search ............. 324/207.25
See application file for complete search history.

(56) References Cited

FOREIGN PATENT DOCUMENTS

JP 2004-279265 10/2004

*Primary Examiner*—Reena Aurora
(74) *Attorney, Agent, or Firm*—Brinks Hofer Gilson & Lione

(57) ABSTRACT

A rotary angle detecting device is provided which includes: a main driving gear configured to rotate while being directly or indirectly connected to a detection target rotating about a predetermined axis; a driven gear configured to rotate while meshing with the main driving gear; a magnet provided at the center of the driven gear; a magnetic detection element configured to detect a variation in magnetic field in accordance with a rotation of the magnet; a circuit board having the magnetic detection element; and the circuit board is separated from the gears by a holder member.

3 Claims, 6 Drawing Sheets

ROTARY ANGLE DETECTING DEVICE

The present invention claims the benefit of Japanese Patent Application JP 2008-132395 filed in the Japanese Patent Office on May 20, 2008, the entire contents of which is incorporated herein by reference.

BACKGROUND

1. Technical Field

The present invention relates to a rotary angle detecting device suitable for detecting, for example, a rotary angle of a detection target such as a steering shaft of a vehicle.

2. Related Art

For example, in a posture control technology of a vehicle, a rotary angle detecting device is suitable for detecting a rotary angle of a steering shaft, rotating in accordance with an operator's steering operation, as an absolute angle. For the rotary angle detection, there is generally known a method in which a main driving gear rotates in accordance with a rotation of a steering shaft and an absolute angle is calculated on the basis of a phase difference of rotation occurring in plural driven gears meshing with the main driving gear. Particularly, upon detecting the rotary angle, the driven gears need to rotate at the low torque without a load. For this reason, a predetermined clearance needs to be ensured between the driven gears and the bearing part thereof. However, when such a clearance is provided, a problem arises in that the detection precision decreases due to a rattling movement occurring in the driven gears in an axial direction in a vehicle running state or an abnormal noise occurs due to a vibration.

For this reason, a technique is known in which a driven gear is elastically pressed in an axial direction so as to suppress a rattling movement or a vibration sound in a vehicle running state (for example, see Japanese Patent Application Laid-Open No. 2004-279265, pages 4 to 5, and FIGS. 1 and 4). The known technique has a configuration in which a driven gear having a magnet provided at the center thereof is accommodated in a case member, and a bearing concave portion is provided in the inner surface of the case member so as to rotatably support one end of the driven gear. In addition, in the case member, a circuit board is disposed in the other end of the driven gear so as to face a magnet, and a magnetic variation detecting element is mounted on the circuit board so as to detect a variation in magnetic field. Particularly, in the known technique, a spring member is installed between the case member and one end of the driven gear so as to press the driven gear against the circuit board by means of the elastic force thereof.

According to the known technique, even when a clearance is provided between the bearing concave portion or the circuit board and the driven gear, it is supposed that the driven gear can rotate at the low torque in the state where the rattling movement or the vibration of the driven gear is suppressed.

However, in the known technique, since the circuit board and the mechanism component such as the main driving gear and the driven gear are disposed in the same space inside the case member, a solder ball or residual flux may be separated from the circuit board or foreign materials such as broken pieces or fine powder may be separated from a broken surface of the circuit board due to a long-time use or a vibration in a vehicle running state. Then, the foreign materials are attached to the meshing part where the main driving gear meshes with the driven gear or the sliding part where the respective gears slide on the circuit board or the like. As a result, a problem arises in that the gears cannot smoothly rotate due to the large rotary torques of the gears or the rotary angle cannot be correctly detected due to the broken gear teeth.

SUMMARY

The present invention is contrived in consideration of the above-described problems, and an advantage of some aspects of the invention is to provide a rotary angle detecting device capable of smoothly rotating a main driving gear and a driven gear at the low torque and of preventing gear teeth from being broken.

In order to solve the above-described problems, the present invention adopts the following configuration.

According to an aspect of the invention, there is provided a rotary angle detecting device including: a main driving gear configured to rotate while being directly or indirectly connected to a detection target rotating about a predetermined axis; a driven gear configured to rotate while meshing with the main driving gear; a magnet provided at the center of the driven gear; a holder member including a first insertion hole which allows the detection target to be inserted therethrough and rotatably supports the main driving gear by means of the first insertion hole and a support portion which rotatably supports the driven gear, the support portion being provided with an opening which faces the magnet; a first cover member including a second insertion hole which allows the detection target to be inserted therethrough and a first space which is formed between the first cover member and the holder member when the first cover member is assembled to one side of the holder member so as to rotatably sandwich the main driving gear and the driven gear and to accommodate the driven gear, a part of the main driving gear being disposed in the first space; a magnetic detection element configured to face the magnet with the opening interposed therebetween so as to detect a variation in magnetic field in accordance with a rotation of the magnet; a circuit board having the magnetic detection element mounted thereon; and a second cover member including a third insertion hole which allows the detection target to be inserted therethrough and a second space which is formed between the second cover member and the holder member when the second cover member is attached to the other side of the holder member so as to accommodate the circuit board, wherein the opening is closed by the circuit board.

According to the rotary angle detecting device of the invention, since the second space accommodating the circuit board having the magnetic detection element mounted thereon is isolated from the first space accommodating the main driving gear and the driven gear, even when the solder ball or residual flux is separated from the circuit board or the broken piece or fine powder is produced from the broken surface of the circuit board due to the long-time use, the foreign materials are not attached to the meshing part where the main driving gear meshes with the driven gear or the sliding part where the respective gears slide on the holder. Accordingly, it is possible to smoothly rotate the main driving gear and the driven gear at the low torque, and to prevent the gear teeth from being broken. As a result, it is possible to obtain the rotary angle detection device with high reliability.

According to the rotary angle detecting device of the invention, the holder member, the first cover member, the main driving gear, and the driven gear may be formed of a synthetic resin; and a sheet-shaped member obtained by processing a metal plate may be interposed between the first cover member and the main driving gear and the driven gear.

With such a configuration, one of the upper and lower portions of the main driving gear and the driven gear contacts with the holder member formed of a synthetic resin, and the other thereof contacts with the metallic sheet-shaped member during the rotation. Accordingly, the respective gears can rotate at the smaller friction resistance compared with the case where both of the upper and lower portions of the respective gears contact with the synthetic-resin holder member and the first cover member. As a result, it is possible to prevent the rattling movement or the vibration of the driven gear, and to smoothly rotate the driven gear.

According to the rotary angle detecting device of the invention, the holder member, the main driving gear, and the driven gear may be formed of a synthetic resin; and at least the first cover member may be obtained by processing a metal plate. In this case, the main driving gear and the driven gear can rotate at the smaller friction resistance. Accordingly, it is possible to more smoothly rotate the gears. In addition, since the thickness of the first cover member can be made small, it is possible to realize a compact in size of the rotary angle detecting device.

According to the rotary angle detecting device of the invention, with the configuration in which the main driving gear and the driven gear are not disposed in the space accommodating the circuit board having the magnetic detection element mounted thereon, even when the solder ball or residual flux is separated from the circuit board or the broken piece or fine powder is produced from the broken surface of the circuit board due to the long-time use, the foreign materials are not attached to the meshing part where the main driving gear meshes with the driven gear or the sliding part where the respective gears slide on the holder. Accordingly, it is possible to smoothly rotate the main driving gear and the driven gear at the low torque, and to prevent the gear teeth from being broken.

DESCRIPTION OF EXEMPLARY EMBODIMENTS

Hereinafter, an exemplary embodiment of the invention will be described with reference to the accompanying drawings.

Figure 1:
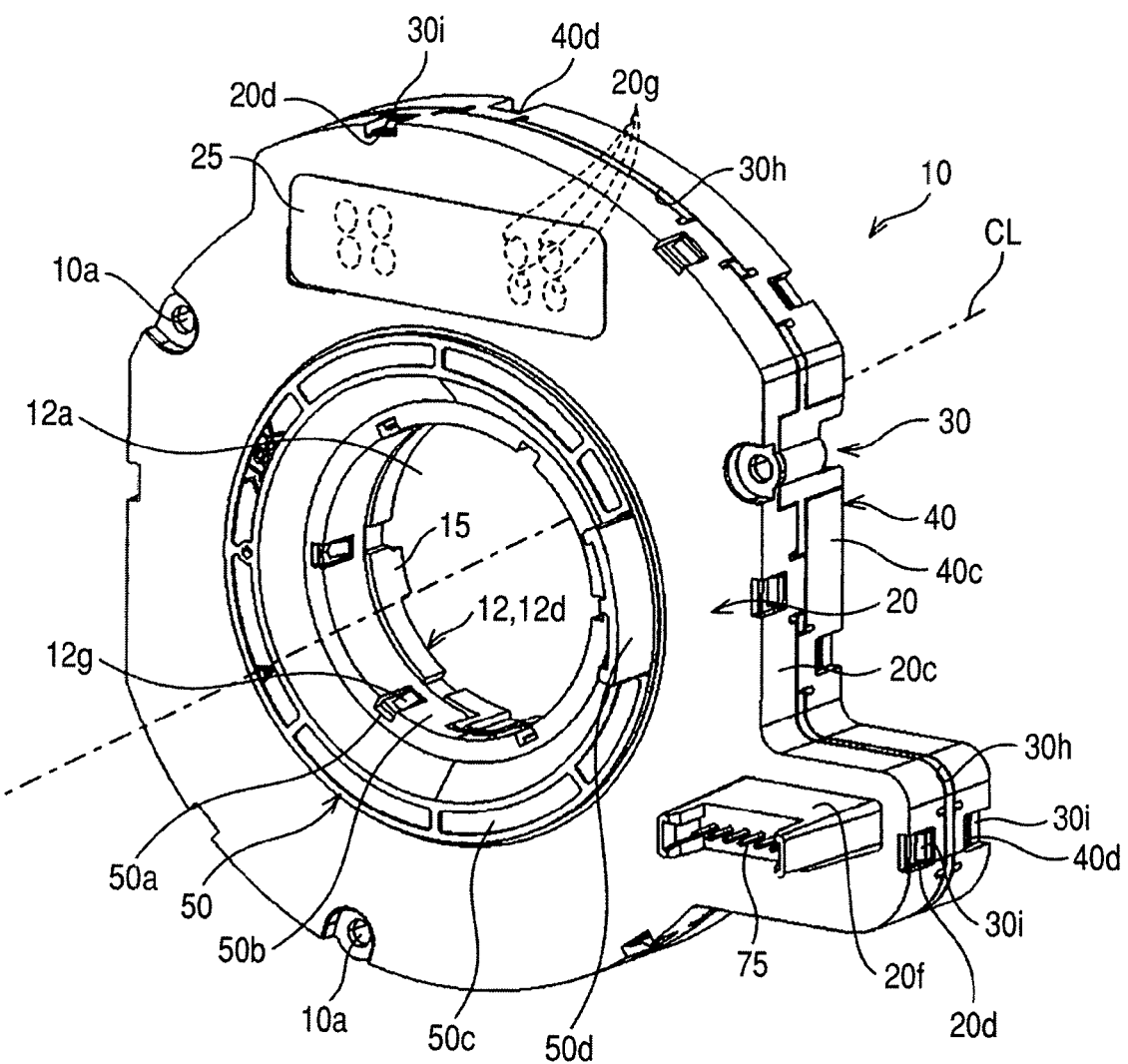
FIG. 1 is a perspective view showing a rotary angle detecting device according to an embodiment.
Figure 2:
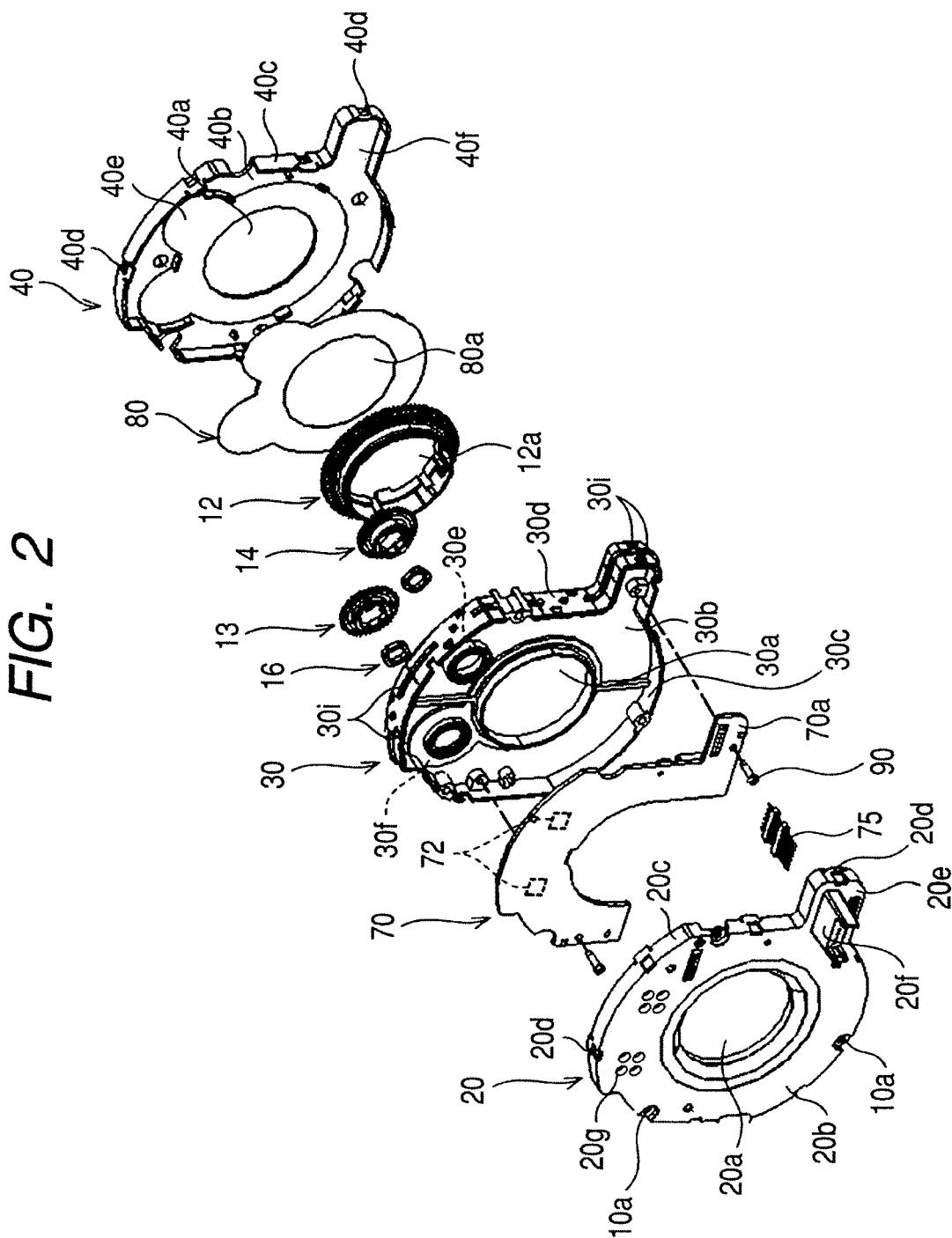
FIG. 2 is an exploded perspective view showing main components of the rotary angle detecting device.
Figure 3:
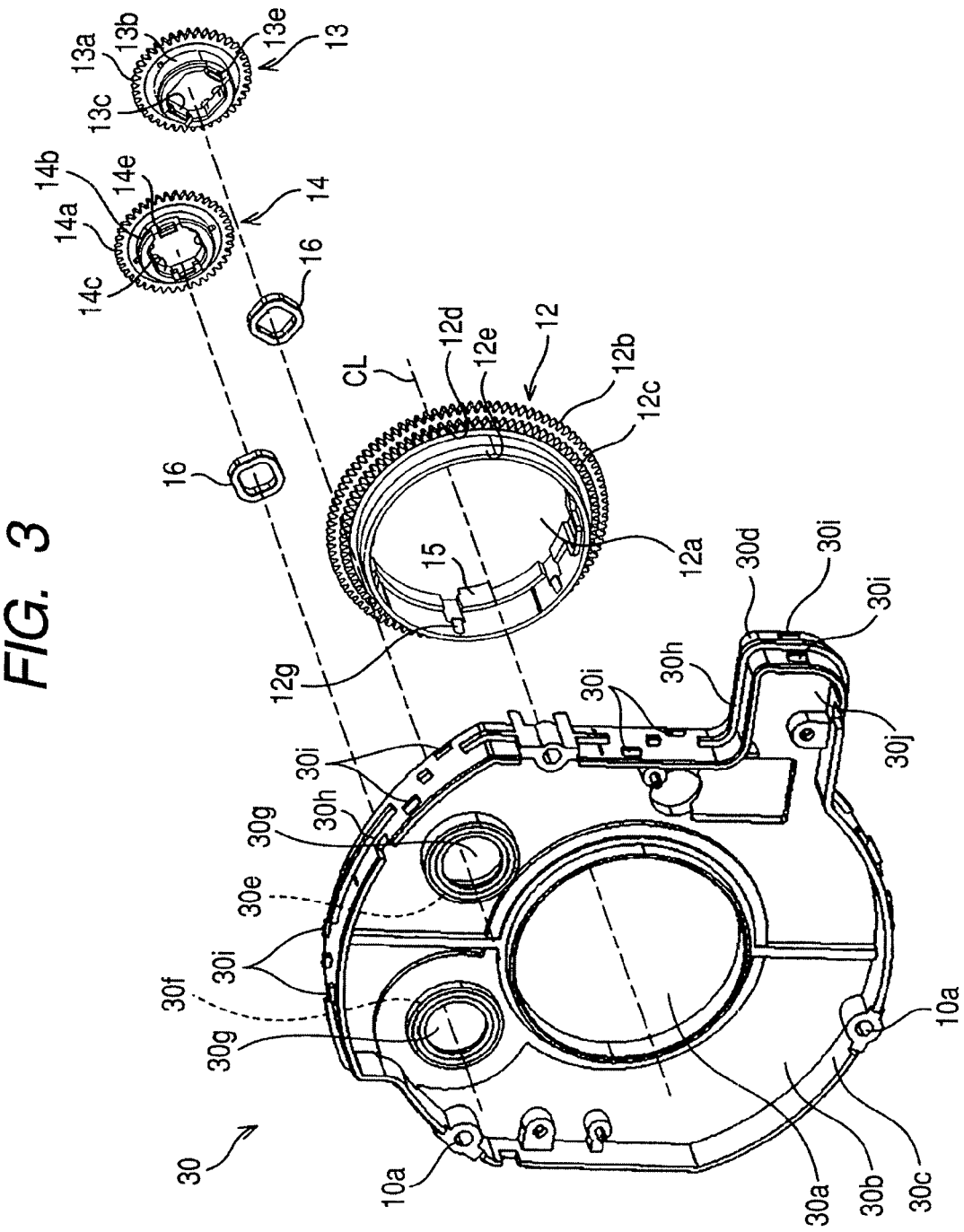
FIG. 3 is an exploded perspective view showing an assembling relationship between a holder and mechanism components.
Figure 4:
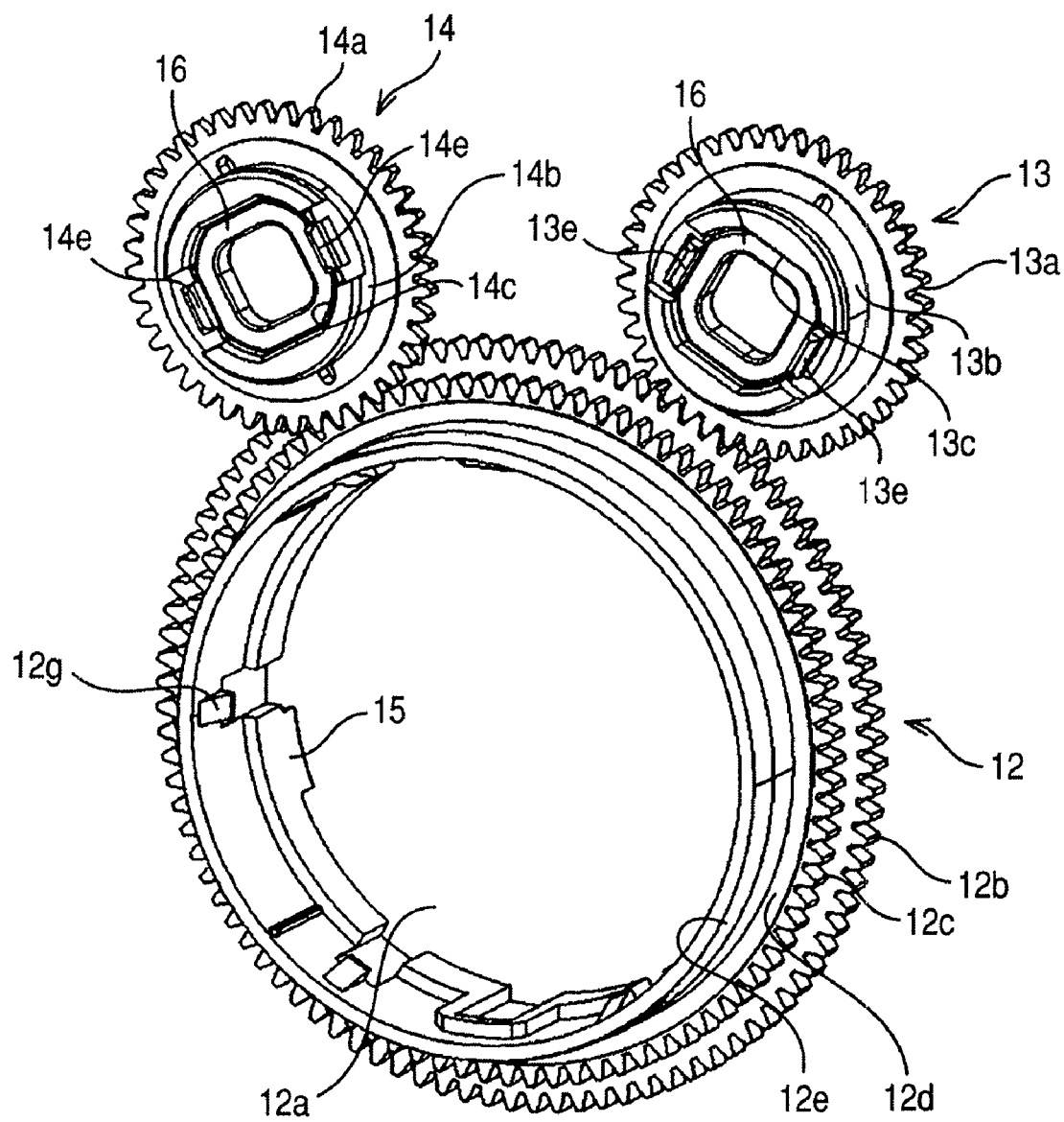
FIG. 4 is an enlarged perspective view showing the meshing state between a main driving gear and a driven gear.
Figure 5:
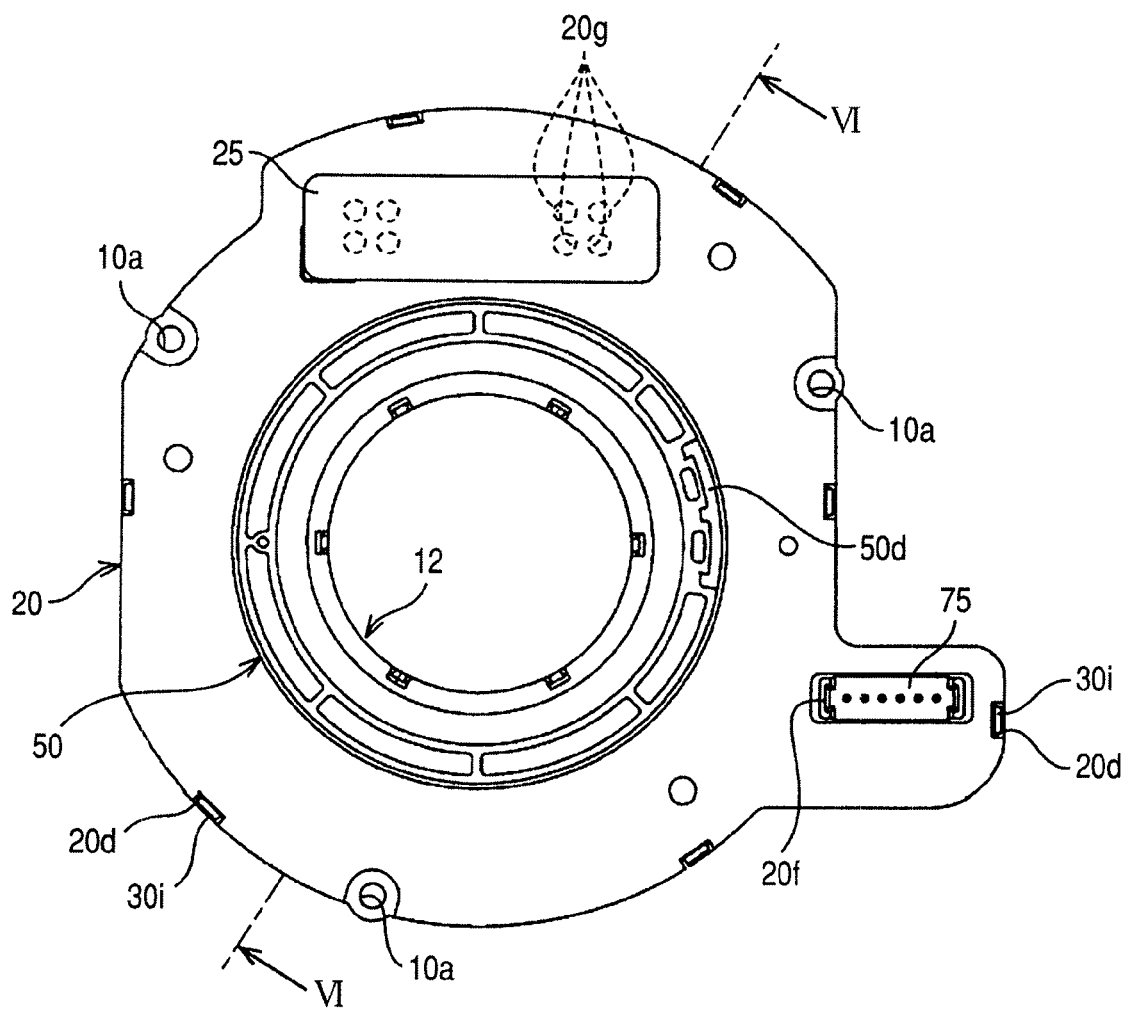
FIG. 5 is a front view showing the assembled rotary angle detecting device.
Figure 6:
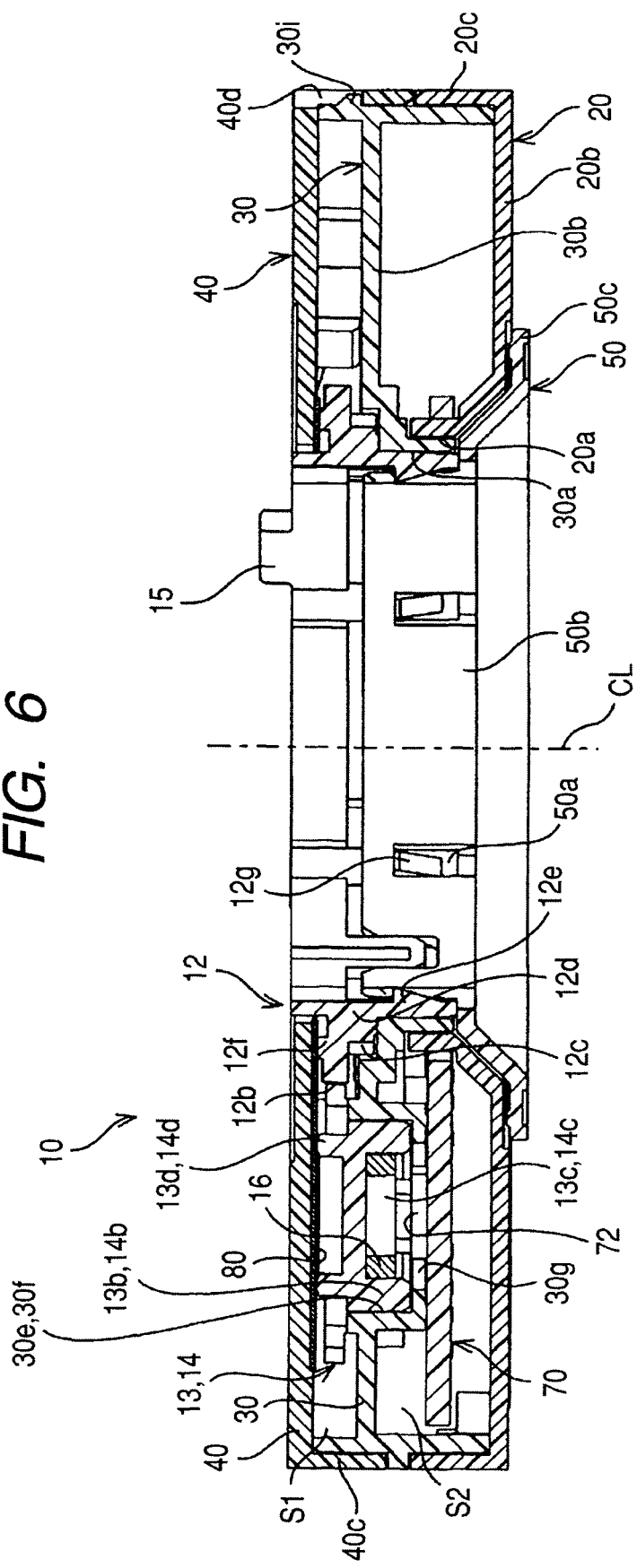
FIG. 6 is a sectional view showing an internal structure of the assembled rotary angle detecting device 10 (in the section taken along the line VI-VI of FIG. 5).

FIG. 1 is a perspective view showing a rotary angle detecting device 10 according to an embodiment. FIG. 2 is an entire exploded perspective view showing the rotary angle detecting device of FIG. 1. FIG. 3 is an exploded perspective view showing a relationship of a holder member, a main driving gear, and a driven gear in FIG. 2. FIG. 4 is a perspective view showing the meshing state between the main driving gear and the driven gear of FIG. 3. FIG. 5 is a front view showing the rotary angle detecting device of FIG. 1. FIG. 6 is a sectional view taken along the line VI-VI of FIG. 5. The rotary angle detecting device 10 is used to detect, for example, a rotary angle of a vehicle steering shaft which is a target to be detected.

The rotary angle detecting device 10 shown in FIG. 1 has a configuration in which a holder member (holder) 30, a first cover member (case) 40, and a second cover member (cover) 20 are incorporated with each other by a snap-fitting operation, and a rotary connector (not shown) is disposed on the outer surface of the cover 40. The rotary connector is used for an electric connection operation between a handle and a vehicle body. A flat cable is accommodated in a wound state in the inside of an accommodation space formed between a movable housing which is connected to the handle and a fixed housing which is fixed to a stator member such as a steering device. In a main driving gear 12 of the rotary angle detecting device 10, since a protrusion 15 formed in the main driving gear 12 engages with a concave portion formed in the movable housing, the main driving gear 12 rotates together with the steering shaft which is configured to rotate about the axis CL in accordance with the handle operation. In addition, the rotary angle detecting device 10 is screw-connected to the fixed housing of the rotary connector by means of each screw (not shown) which is inserted through each screw insertion hole 10a formed in the peripheral edge of the rotary angle detecting device 10. A cam rotor 50 described below is attached to the rotary angle detecting device 10 in such a manner that each claw portion 12g of the main driving gear 12 is snap-fitted to each engagement groove 50a.

The main driving gear 12 which is a molded product formed of a synthetic resin includes an insertion hole 12a for allowing the steering shaft to be inserted therethrough, where a small diameter portion 12e is continuously formed with a large diameter portion 12d provided with two-stage gears 12b and 12c having a different number of gear teeth (see FIG. 4 and the like). When the small diameter portion 12e of the main driving gear 12 is inserted into a first insertion hole 30a of the holder 30, as shown in FIG. 6, the lower surface of the large diameter portion 12d comes into contact with the peripheral surface of the first insertion hole 30a of the holder 30 so as to be rotatably supported to the holder 30. In addition, in the large diameter portion 12d, a first annular ring portion 12f is provided so as to protrude toward the inner surface of the case 40, and the end surface of the first ring portion 12f comes into contact with a sheet-shaped member 80 provided in the inner surface of the case 40.

As shown in FIG. 1, the main driving gear 12 and the cam rotor 50 are incorporated with each other in such a manner that the claw portion 12g provided in the inner wall forming the insertion hole 12a of the main driving gear 12 is snap-fitted to the engagement groove 50a of the cam rotor 50. In addition, in the main driving gear 12, the protrusion 15 protrudes outward along the axis CL from the large diameter portion 12d, and the protrusion 15 engages with the concave portion of the movable housing of the rotary connector disposed on the outer surface of the case 40. Accordingly, the main driving gear 12 is connected to the movable housing, and the movable housing is connected to the steering shaft with the handle interposed therebetween. As a result, since the main driving gear 12 is indirectly connected to the steering shaft, the main driving gear 12 rotates in accordance with the handle operation.

Driven gears 13 and 14 which are molded products formed of a synthetic resin includes holding portions 13b and 14b respectively provided with gears 13a and 14a having the same number of gear teeth, and the gears 13a and 14a respectively mesh with the gears 12b and 12c of the main driving gear 12 so as to rotate at different speeds. Magnets 16 are respectively accommodated in accommodation portions 13c and 14c which are respectively provided at the center portions of the holding portions 13b and 14b. When the holding portions 13b and 14b of the driven gears 13 and 14 are inserted into first support portions 30e and 30f (concave portions) of the holder 30, as shown in FIG. 6, the driven gears 13 and 14 are rotatably supported to the holder 30, respectively, so that each magnet 16 faces each opening 30g provided in the first support portions 30e and 30f. In addition, as shown in FIG. 6, the holding portions 13b and 14b are respectively provided with second annular ring portions 13d and 14d which protrude toward the inner surface of the case 40, and the end surfaces of the second ring portions 13d and 14d come into contact with the sheet-shaped member 80 provided in the inner surface of the case 30.

Each dimension along the axis CL of the second ring portions 13d and 14d and the holding portions 13b and 14b of the driven gears 13 and 14 is appropriately set so that the gears 13a and 14a respectively mesh with the gears 12b and 12c of the main driving gear 12. In addition, as shown in FIG. 3, the ends of the accommodation portions 13c and 14c on the side of the holder 20 are respectively provided with protrusion portions 13e and 14e. The protrusion portions 13e and 14e are used to reliably fix the magnets 16 respectively accommodated in the accommodation portions 13c and 14c, and are pressed to be deformed by a heater in the state where the magnets 16 are respectively accommodated in the accommodation portions 13c and 14c.

Each magnet 16 is formed into a rectangular ring body, of which one of a pair of facing sides is magnetized as an N pole and the other thereof is magnetized as an S pole, so that the magnets 16 are respectively attached to the insides of the accommodation portions 13c and 14c of the two driven gears 13 and 14. When the magnets 16 are respectively accommodated and fixed to the accommodation portions 13c and 14c, the magnetic induction lines are formed in parallel to the surfaces of the magnets 16, thereby highly precisely detecting a variation in magnetic field in accordance with the rotation of the magnets 16 by means of a magnetic detection element 72.

As shown in FIG. 3, the holder 30 which is a molded product formed of a synthetic resin includes a bottom plate portion 30b which is provided with the first insertion hole 30a for allowing the steering shaft to be inserted therethrough; upright portions 30c and 30d which are uprightly formed in the outer edge of the bottom plate portion 30b so as to respectively face the opposite directions along the axis CL; and the first support portions 30e and 30f which respectively support the driven gears 13 and 14 so as to be rotatable. The first support portions 30e and 30f are respectively formed into concave portions for allowing the holding portions 13b and 14b of the driven gears 13 and 14 to be inserted thereinto in a rotatably supported state, and the inner bottom surfaces of the concave portions are respectively provided with the openings 30g and 30g which respectively face the magnets 16. As shown in FIG. 6, when the holding portions 13b and 14b of the driven gears 13 and 14 are respectively inserted into the first support portions 30e and 30f, the driven gears 13 and 14 are rotatably supported to the holder 30 so that each magnet 16 faces each opening 30g. The depth dimensions of the first support portions 30e and 30f are appropriately set in accordance with the dimensions of the holding portions 13b and 14b of the driven gears 13 and 14. As shown in FIGS. 1 and 3, the outer surface of the holder 30 is provided with plural hook portions 30h and claw portions 30i which extend in a circumferential direction. When the case 40 and the cover 20 are attached to the holder 30, the opening ends of the case 40 and the cover 20 are caught by the hook portions 30h, and the claw portions 30i are respectively snap-fitted to engagement holes 40d provided on the side surface of the case 40 and engagement holes 20d provided on the side surface of the cover 20. In addition, the holder 30 is provided with a protrusion portion 30j which extends in a lateral direction.

Also, the case 40 which is a molded product formed of a synthetic resin includes a bottom plate portion 40b which is provided with a second insertion hole 40a for allowing the steering shaft to be inserted therethrough and an upright portion 40c which is uprightly formed from the outer edge of the bottom plate portion 40b toward the holder 30. The case 40 is formed into a hollow concave portion which is opened toward the holder 30. Accordingly, when the case 40 is attached to the holder 30, a space S1 as a first space is formed between the case 40 and the holder 30, and the driven gears 13 and 14 are accommodated in the space S1. The main driving gear 12 and the driven gears 13 and 14 are rotatably sandwiched between the case 40 and the holder 30. In addition, as shown in FIG. 6, the space S1 is formed by being surrounded by the holder 30, a circuit board 70, the case 40, and the main driving gear 12. A part of the main driving gear 12, that is, the gears 12b and 12c provided in the larger diameter portion 12d is disposed in the space S1. The outer surface of the upright portion 40c is provided with the engagement holes 40d which respectively snap-fitted to the claw portions 30i of the holder 30. The bottom plate portion 40b is provided with a positioning concave portion 40e which positions the sheet-shaped member 80 described below. The case 40 is provided with a protrusion portion 40f which extends in a lateral direction so as to have a shape corresponding to a shape of the protrusion portion 30j of the holder 30.

The magnetic detection element 72 is configured as a GMR (Giant Magneto-Resistive) sensor, and is mounted to the circuit board 70 so as to face the magnet 16 via the opening 30g of the holder 30.

As shown in FIG. 2, the circuit board 70 includes a protrusion portion 70a which has a shape corresponding to a shape of the protrusion portion 30j of the holder 30. The protrusion portion 70a is provided with a connector 75 which has plural connection terminals used to be connected to an external connector. In addition, the circuit board 70 is fixed to the holder 30 by means of a screw 90 so as to close the openings 30g.

Also, the cover 20 which is a molded product formed of a synthetic resin includes a bottom plate portion 20b which is provided with a third insertion hole 20a for allowing the steering shaft to be inserted therethrough and an upright portion 20c which is uprightly formed from the outer edge of the bottom plate portion 20b toward the holder 30. The cover 20 is formed into a hollow concave portion which is opened toward the holder 30. Accordingly, when the cover 20 is attached to the holder 30, a space S2 for accommodating the circuit board 70 is formed between the cover 20 and the holder 30. The outer surface of the upright portion 20c is provided with the engagement holes 20d which are respectively snap-fitted to the claw portions 30c of the holder 30. In addition, the cover 20 includes a protrusion portion 20e which protrudes in a lateral direction, and the protrusion portion 20e includes a connector drawn portion 20f which is provided with the connector 75.

As shown in FIG. 1, the bottom plate 20b of the cover 20 is provided with plural pin insertion holes 20g. The pin insertion holes 20g are used to allow a contact probe to be inserted therethrough upon inspecting an electric characteristic or registering software in a built-in device after the rotary angle detecting device 10 is assembled. In addition, after the inspection or the like ends, for example, a label 25 shown in the drawing is attached thereto so as to close the pin insertion holes 20g.

The sheet-shaped member 80 is obtained by processing a metal plate formed of stainless steel or the like to have a predetermined shape. The sheet-shaped member 80 includes an opening 80a which allows the steering shaft to be inserted therethrough and a convex ring (not shown) which positions the ends of the second ring portions 13d and 14d.

As shown in FIG. 1, the cam rotor 50 includes a cylindrical body 50b which is capable of being inserted through the insertion hole 12a of the main driving gear 12 and a flange portion 50c which extends outward from the end of the cylindrical body 50b in a radial direction. The cylindrical body 50b is provided with the plural engagement grooves 50a. When the cylindrical body 50b is inserted into the first insertion hole 12a of the main driving gear 12, since each engagement groove 50a is snap-fitted to each claw portion 12g, the cam rotor 50 can rotates together with the main driving gear 12. In addition, the flange portion 50c of the cam rotor 50 is provided with a cancellation protrusion 50d which protrudes outward along the axis CL. In the state where an operation lever of a turn signal switch (not shown) is moved to one of left and right ON positions, the cancellation protrusion 50d is used to return the operation lever to an OFF (neutral) position.

In the rotary angle detecting device 10 having the above-described configuration, since the circuit board 70 is attached to the holder 30 so as to close the openings 30g thereof, the space S2 accommodating the circuit board 70 having the magnetic detection element 72 mounted thereon is isolated from the space S1 accommodating the main driving gear 12 and the driven gears 13 and 14. For this reason, even when the solder ball or residual flux is separated from the circuit board 70 or the broken piece or fine powder is produced from the broken surface of the circuit board 70 due to the long-time use, the foreign materials are not attached to or interposed in the meshing part where the main driving gear 12 meshes with the driven gears 13 and 14 or the sliding part where the respective gears slide on the holder 30. Accordingly, it is possible to smoothly rotate the main driving gear 12 and the driven gears 13 and 14 at the low torque, and to prevent the teeth of the respective gears from being broken. As a result, it is possible to obtain the rotary angle detection device with high reliability.

In addition, the case 40, the holder 30, the main driving gear 12, and the driven gears 13 and 14 are the molded products formed of a synthetic resin, and the sheet-shaped member 80 obtained by processing the metal plate is interposed between the case 40 and the gears 12, 13, and 14. For this reason, the respective gears can rotate at the smaller friction resistance compared with the configuration in which both end surfaces of the gears contact with the synthetic-resin member. Accordingly, it is possible to prevent the rattling movement or vibration of the driven gears 13 and 14, and to smoothly rotate the driven gears 13 and 14. In addition, the rotary angle detecting device according to the invention may have the configuration in which at least the case 40 is obtained by processing the metal plate. In this case, since the main driving gear 12 and the driven gears 13 and 14 can rotate at the smaller friction resistance, it is possible to more smoothly rotate the gears. In addition, since the thickness of the case 40 can be made small, it is possible to realize a compact in size of the rotary angle detecting device. If the cover 20 is also obtained by processing the metal plate, it is possible to obtain the better advantage.

Further, the driven gears 13 and 14 and the main driving gear 12 are rotatably supported to the holder 30 just by adopting the configuration in which the holding portions 13b and 14b of the driven gears 13 and 14 are respectively inserted into the support portions 30e and 30f (concave portions) of the holder 30, and the small diameter portion 12e of the main driving gear 12 is inserted into the first insertion hole 30a of the holder 30. Accordingly, it is possible to highly precisely position the main driving gear and the driven gears just by carrying out the simple attaching operation.

Furthermore, in this embodiment, the configuration is described in which the main driving gear 12 provided with the two-stage gears 12b and 12c having the different number of gear teeth meshes with the two driven gears 13 and 14 having the same number of gear teeth, but the one-stage main driving gear may mesh with the plural driven gears having the different number of gear teeth, or the one-stage main driving gear may mesh with only one driven gear. Of course, the present invention can be applied to the gears having various configurations in accordance with the purpose.

Moreover, in this embodiment, the configuration example is described in which the main driving gear 12 is indirectly connected to the steering shaft, but the main driving gear 12 of the rotary angle detecting device 10 may be directly connected to the steering shaft, or the cam rotor 50 may not be mounted to the rotary angle detecting device 10.

It should be understood by those skilled in the art that various modifications, combinations, sub-combinations and alterations may occur depending on design requirements and other factors insofar as they are within the scope of the appended claims of the equivalents thereof.

What is claimed is:

1. A rotary angle detecting device comprising:
   a main driving gear configured to be rotatable when directly or indirectly connected to a detection target rotating about a predetermined axis;
   a driven gear configured to be rotatable when meshed with the main driving gear;
   a magnet provided at a center of the driven gear;
   a holder member including a first insertion hole sized and dimensioned so that the detection target is insertable therethrough such that a surface of the first insertion hole rotatably supports the main driving gear; the holder member having a support portion to rotatably support the driven gear, and an opening of the support portion faces the magnet;
   a first cover member including a second insertion hole sized and dimensioned so that the detection target is insertable therethrough; the first cover member and a first side of the holder member spaced apart to form a first space when the first cover member is assembled to first side of the holder member, so that the main driving gear and the driving gear are disposed therebetween, and a part of the main driving gear disposed in the first space;
   a magnetic detection element, disposed to face the magnet with the opening of the support portion interposed therebetween, so as to detect a variation in magnetic field in accordance with a rotation of the magnet;
   a circuit board having the magnetic detection element mounted thereon; and
   a second cover member including a third insertion hole sized and dimensioned so that the detection target is insertable therethrough, the second cover member and the holder member spaced apart to form a second space to accommodate the circuit board when the second cover member is attached to a second side of the holder member,
   wherein the opening in the support portion of the holder member is closed by the circuit board.

2. The rotary angle detecting device according to claim 1, wherein the holder member, the first cover member, the main driving gear, and the driven gear are formed of a synthetic resin, and
   wherein a metal plate is interposed between the first cover member, the main driving gear and the driven gear.

3. The rotary angle detecting device according to claim 1, wherein the holder member, the main driving gear, and the driven gear are formed of a synthetic resin, and
   wherein the first cover member is a metal plate.

* * * * *